(12) United States Patent
Schowengerdt

(10) Patent No.: US 11,135,967 B1
(45) Date of Patent: Oct. 5, 2021

(54) LARGE VEHICLE SIGNALING SYSTEM

(71) Applicant: Finch Electronics, Keller, TX (US)

(72) Inventor: Christopher Schowengerdt, Keller, TX (US)

(73) Assignee: FINCH ELECTRONICS, Keller, TX (US)

(*) Notice: Subject to any disclaimer, the term of this patent is extended or adjusted under 35 U.S.C. 154(b) by 0 days.

(21) Appl. No.: 17/086,380

(22) Filed: Oct. 31, 2020

(51) Int. Cl.
*B60Q 1/26* (2006.01)
*B60Q 1/44* (2006.01)
*B60Q 1/34* (2006.01)
*B60Q 1/00* (2006.01)
*F21S 43/14* (2018.01)
*F21V 21/26* (2006.01)
*F21S 43/19* (2018.01)
*F21Y 115/10* (2016.01)
*F21W 103/35* (2018.01)
*F21W 103/20* (2018.01)

(52) U.S. Cl.
CPC ......... *B60Q 1/2615* (2013.01); *B60Q 1/0088* (2013.01); *B60Q 1/34* (2013.01); *B60Q 1/44* (2013.01); *F21S 43/14* (2018.01); *F21S 43/195* (2018.01); *F21V 21/26* (2013.01); *B60Q 2400/20* (2013.01); *F21W 2103/20* (2018.01); *F21W 2103/35* (2018.01); *F21Y 2115/10* (2016.08)

(58) Field of Classification Search
CPC ...... B60Q 1/2615; B60Q 1/34; B60Q 1/0088; B60Q 1/44; B60Q 2400/20; B60Q 7/02; F21V 21/26; F21S 43/14; F21S 43/195; F21L 14/04; F21W 2103/20; F21W 2103/35; F21Y 2115/10
See application file for complete search history.

(56) References Cited

U.S. PATENT DOCUMENTS

| | | | |
|---|---|---|---|
| 4,896,251 A * | 1/1990 | Fasel | B60Q 1/2615 362/362 |
| 5,588,036 A | 12/1996 | Fujise et al. | |
| 5,845,990 A * | 12/1998 | Hymer | B60Q 1/30 362/541 |
| D441,678 S | 5/2001 | Jon H Lyons | |
| 6,840,660 B2 | 1/2005 | Hymer | |
| 7,819,566 B2 * | 10/2010 | Kolstee | B60Q 1/0088 362/540 |

(Continued)

FOREIGN PATENT DOCUMENTS

| | | |
|---|---|---|
| DE | 20302614 | 2/2003 |
| GB | 2507279 A | 4/2014 |

*Primary Examiner* — Peggy A Neils
(74) *Attorney, Agent, or Firm* — Kirby Drake

(57) ABSTRACT

A large vehicle signaling system utilizing at least two signals in conjunction with the vehicle's lighting system to mirror the vehicle's brake and turn signals. The at least two signals may be attached to the rear face of the vehicle or brackets that allow them to pivot and move away from the rear face when not in use. The at least two signals should be positioned at a height of at least 80 inches from the ground so that they may be seen by a driver even if there are other vehicles between the driver and the large vehicle. When positioned in this way, the signaling system may allow for drivers of large vehicles to maneuver more safely as other drivers will be more aware of their signals.

13 Claims, 4 Drawing Sheets

(56) References Cited

U.S. PATENT DOCUMENTS

| | | | |
|---|---|---|---|
| 8,564,205 B2 * | 10/2013 | Roberts | B60Q 1/2603 315/82 |
| 8,636,394 B2 * | 1/2014 | Kenyon | B60Q 1/24 362/485 |
| 8,653,957 B2 * | 2/2014 | Ehrlich | B60Q 1/0088 340/431 |
| RE44,787 E * | 3/2014 | Burgess | B60Q 1/0483 362/478 |
| 9,260,055 B2 | 2/2016 | McDermott | |
| 10,737,610 B1 * | 8/2020 | Stinar, Sr. | B60Q 1/2607 |
| 2011/0090072 A1 * | 4/2011 | Haldeman | B60Q 1/305 340/431 |
| 2020/0039426 A1 * | 2/2020 | Eaton | G06F 3/147 |

\* cited by examiner

LARGE VEHICLE SIGNALING SYSTEM

FIELD OF THE DISCLOSURE

The present disclosure generally relates to vehicle safety, and more particularly to signaling systems for large vehicles.

BACKGROUND

Large vehicles, including semi trucks and trailer units hauling shipping containers, make up a large percentage of the vehicles using the roads every day. These vehicles use brake and turn signal lights like all vehicles, but they are often small and poorly positioned for anyone other than the vehicle directly behind them to see. Many accidents have been caused when a large vehicle has its turn signal or brake lights on, but because of how the turn signal or brake lights are positioned, another vehicle does not see them.

SUMMARY

Embodiments of the present disclosure may provide a large vehicle signaling system that may comprise at least two signals that may be connected to the large vehicle's lighting system which may allow them to work in conjunction with at least the vehicle's brake and turn lights. The signaling system may be connected to the large vehicle's lighting system through direct current pigtail connectors though it should be appreciated other methods may be used without departing from the present disclosure. The at least two signals may be positioned at a height of at least 80 inches from the ground. The at least two signals may comprise a base, a plurality of walls that may be connected to the base to form a compartment, a plurality of lights that may be inside the compartment, and a cover that may be made of a transparent material and may be connected to a top portion of the plurality of walls. The base and plurality of walls may be made of polystyrene or polycarbonate. In different embodiments of the present disclosure, the at least two signals may be removably attached or fixedly attached to the large vehicle. The large vehicle may be a semi truck trailer or a shipping container. It should be appreciated that the system may work with other large vehicles without departing from the present disclosure.

Further embodiments of the present disclosure may provide at least two brackets. Each of the at least two brackets may comprise a connecting panel, an arm, and a hinge connecting the connecting panel to the arm. One of the at least two signals may be attached to the arm. The hinge may be operable to allow the arm to pivot but also may allow the arm to lock in place when it is positioned on a rear face of the vehicle. Different embodiments of the present disclosure may provide for the connecting panels to be fixedly attached to opposing sides of the vehicle or removably attached to opposing sides of the vehicle. The connecting panel may be positioned so that the arm may be positionable on the rear face of the vehicle whereby the at least two signals are aligned.

Other embodiments of the present disclosure may provide a large vehicle signaling system that may comprise at least two signals that may be connected to the vehicle's lighting system which may allow them to work in conjunction with at least the vehicle's brake and turn lights. The at least two signals may be removably connected to the rear face of the large vehicle and may be positioned at a height of at least 80 inches from the ground. The at least two signals may comprise a base, a plurality of walls that may be connected to the base and may form a compartment, a plurality of Light Emitting Diode (LED) lights that may be inside the compartment, and a cover that may be made of a transparent material and may be connected to a top portion of the plurality of walls. The base and plurality of walls may be made of polystyrene or polycarbonate. The large vehicle may be a semi truck trailer or a shipping container. It should be appreciated that the system may work with other large vehicles without departing from the present disclosure. The at least two signals may be connected to the large vehicle's lighting system through DC pigtail connectors, though it should be appreciated that other methods may be used without departing from the present disclosure.

Further embodiments of the present disclosure may provide a large vehicle signaling system that may comprise at least two signals that may be removably connected to the vehicle's signaling system which may allow the at least two signals to work in conjunction with at least the vehicle's brake and turn signals, and at least two brackets. The at least two signals may comprise a base, a plurality of walls that may be connected to the base to form a compartment, a plurality of lights that may be placed inside the compartment, and a cover that may be transparent and may be connected to a top portion of the plurality of walls. The at least two brackets may comprise a connecting panel, an arm, one of the at least two signals may be attached to the arm, and a hinge that may be connected to the connecting panel and the arm. The hinge may be operable to pivot the arm around the hinge and may lock the arm in place when positioned on a rear face of the large vehicle. The at least two brackets may be connected to opposing sides of the vehicle such that the arms. Of each of the at least two brackets may be positionable on the rear face of the large vehicle whereby the at least two signals may be aligned. The base and plurality of walls may be made of polystyrene or polycarbonate. The large vehicle may be a semi truck trailer or a shipping container. It should be appreciated that the system may work with other large vehicles without departing from the present disclosure. The lights in the compartment of the at least signals may be LED lights, though it should be appreciated that other lights may be used without departing from the present disclosure.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may generally provide a large vehicle signaling system that may provide a large vehicle signaling system that may comprise at least two signals that each may include a base, a plurality of walls, lights, and a cover. The at least two signals may be attached to a large vehicle and may be integrated into the vehicle's lighting system and may mirror the vehicle's brake and turn signals.

Figure 1:
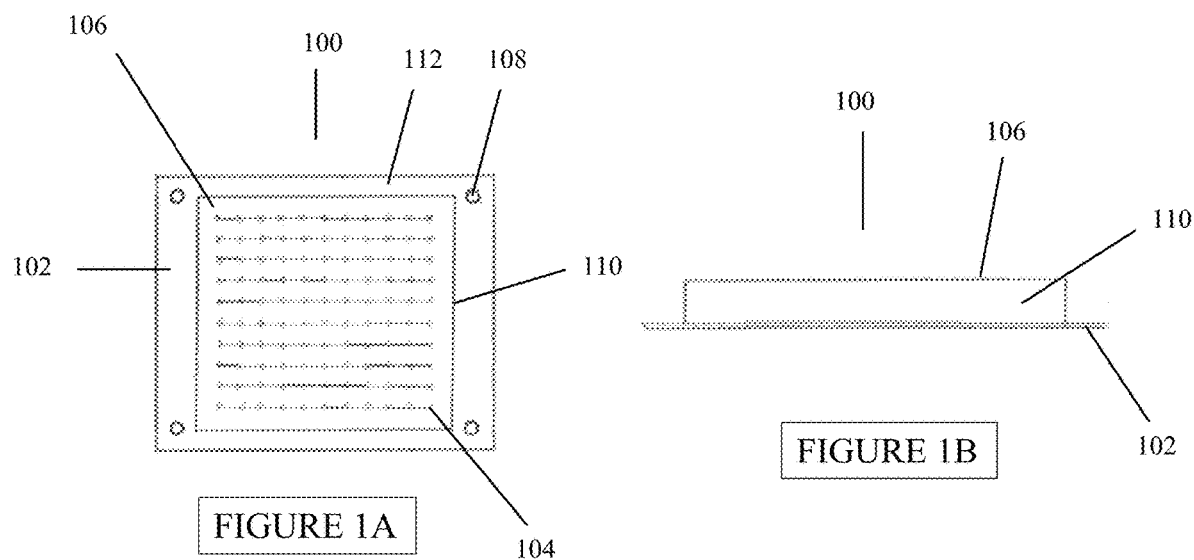
FIG. 1A depicts a perspective view of a large vehicle signaling system according to an embodiment of the present disclosure.
FIG. 1B depicts a side view of a large vehicle signaling system according to an embodiment of the present disclosure.

FIG. 1A depicts a perspective view of a large vehicle signaling system according to an embodiment of the present disclosure. More specifically, FIG. 1A depicts signal 100. In a large vehicle signaling system, it should be appreciated that more than one signal 100 may be used at a time. Signal 100 provides base 102 that may hold the other components and may allow the signaling system to be mounted. Base 102 may include mounting holes 108 that may be configured to accept screws, bolts, or similar materials to mount signal 100 to a vehicle. While signal 100 is depicted as including four mounting holes 108, it should be appreciated that more or fewer mounting holes 108 may be included without departing from the present disclosure. In an embodiment of the present disclosure, base 102 may have a length of 12-14 inches and a width of 12-14 inches. However, it should be appreciated that base 102 may be larger or smaller than the listed length and width without departing from the present disclosure.

Base 102 may also provide wall 110 that may hold the lighting components of signal 100. In an embodiment of the present disclosure, wall 110 may have a height of ¾ to 1¼ inches, but it should be appreciated that it may be shorter or taller without departing from the present disclosure. Base 102 and wall 110 may be made of the same material which may be polystyrene, polycarbonate, or another suitable material. However, there may be embodiments of the present disclosure where base 102 and wall 110 may be formed of different materials. Inside of wall 110 there may be a plurality of light emitting diode (LED) lights 104. While a plurality of LED lights 104 are described herein, it should be appreciated that other types of lighting components may be used without departing from the present disclosure A plurality of walls 110 may rise vertically from base 102 and touch each other to create compartment 112 that may house LED lights 104. LED lights 104 may be protected by cover 106 and may allow them to be visible through cover 106. Compartment 112 may be sealed from air and water to protect against the elements, and since the lights included within compartment 112 generally are LED, heat is not emitted and there is not a need for ventilation. Cover 106 may be made of a durable and weatherproof material, such as polycarbonate, that may also allow the light from LED lights 104 to penetrate. Cover 106 may be ⅛ inches in thickness in an embodiment of the present disclosure. Cover 106 may be attached to wall 110 in a way that makes the light area weatherproof and watertight. More specifically, cover 106 may be sized to fit within the top opening of compartment 112 and be secured with adhesive. Additionally, or alternatively, the connection points, where cover 106 meets with the plurality of walls 110, may have a material, such as a watertight caulk, applied to ensure that signal 100 can be used in all types of weather conditions. It should be appreciated that other materials may be applied to the connection points without departing from the present disclosure.

FIG. 1B depicts a side view of a large vehicle signaling system according to an embodiment of the present disclosure. FIG. 1B shows how cover 106 may not hang over wall 110 and may be flat. Wall 110 may rise vertically from base 102 to create compartment 112 to house lights 104, which may be LED lights in an embodiment of the present disclosure. Wall 110 and base 102 may be made from the same material but may also be made from different materials without departing from the present disclosure. Compartment 112 may extend vertically at least enough to accommodate LED lights 104, but it should be appreciated that it may have an increased height to accommodate other types of lights without departing from the present disclosure.

Figure 2:
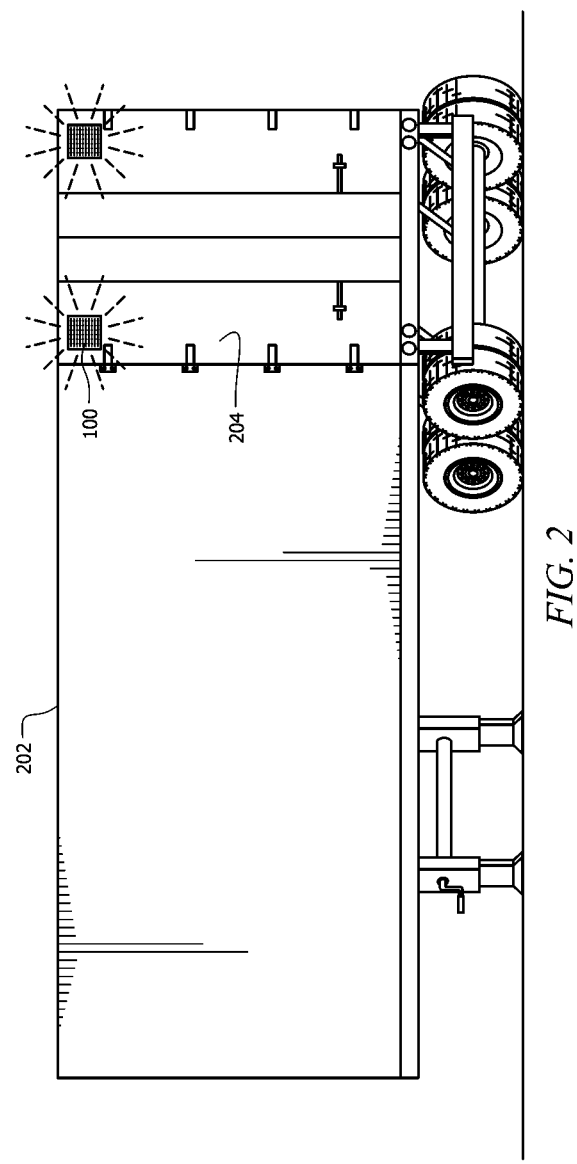
FIG. 2 depicts a large vehicle signaling system attached to a trailer according to an embodiment of the present disclosure.

FIG. 2 depicts a large vehicle signaling system attached to trailer 202 according to an embodiment of the present disclosure. At least one signal 100 may be attached to door 204 of trailer 202. At least one signal 100 may be attached to door 204 through any number of means including, but not limited to, bolts, screws, and/or adhesive. In different embodiments of the present disclosure, at least one signal 100 may be fixedly attached to trailer 202 or may be removably attached. At least one signal 100 may also be connected to the lighting system for trailer 202 so that it does not require its own separate power source relative to the trailer or other large vehicle to which it may be attached. The lighting system for trailer 202 may provide power to all signal lights, both those existing on trailer 202 as well as lights included as part of at least one signal 100 and also may connect the signal lights to the driver's controls so when the brake is pushed, the lights may respond accordingly, or when a turn signal is activated, the signal lights may respond. At least one signal 100 may be attached to existing trailers without the need for trailer 202 to be taken out of commission for the signals to be permanently fixed in the frame of the trailer that surrounds and holds the doors, or doors. At least one signal 100 may be positioned at least 80 inches from the ground to allow it to be seen by vehicles that may be traveling behind trailer 202 in embodiments of the present disclosure. In an embodiment of the present disclosure, at least one signal 100 may be positioned approximately 150 inches or 156 inches. By placing at least one signal 100 at a height of at least 80 inches, at least one signal 100 may be viewable to vehicles further behind trailer 202. At this height, the lights associated with at least one signal 100 may be viewable even if there are other vehicles between trailer 202 and a driver, and the driver may be properly informed of braking or turning by trailer 202. However, it should be appreciated that at least one signal may be positioned higher than 80 inches without departing from the present disclosure.

Figure 3:
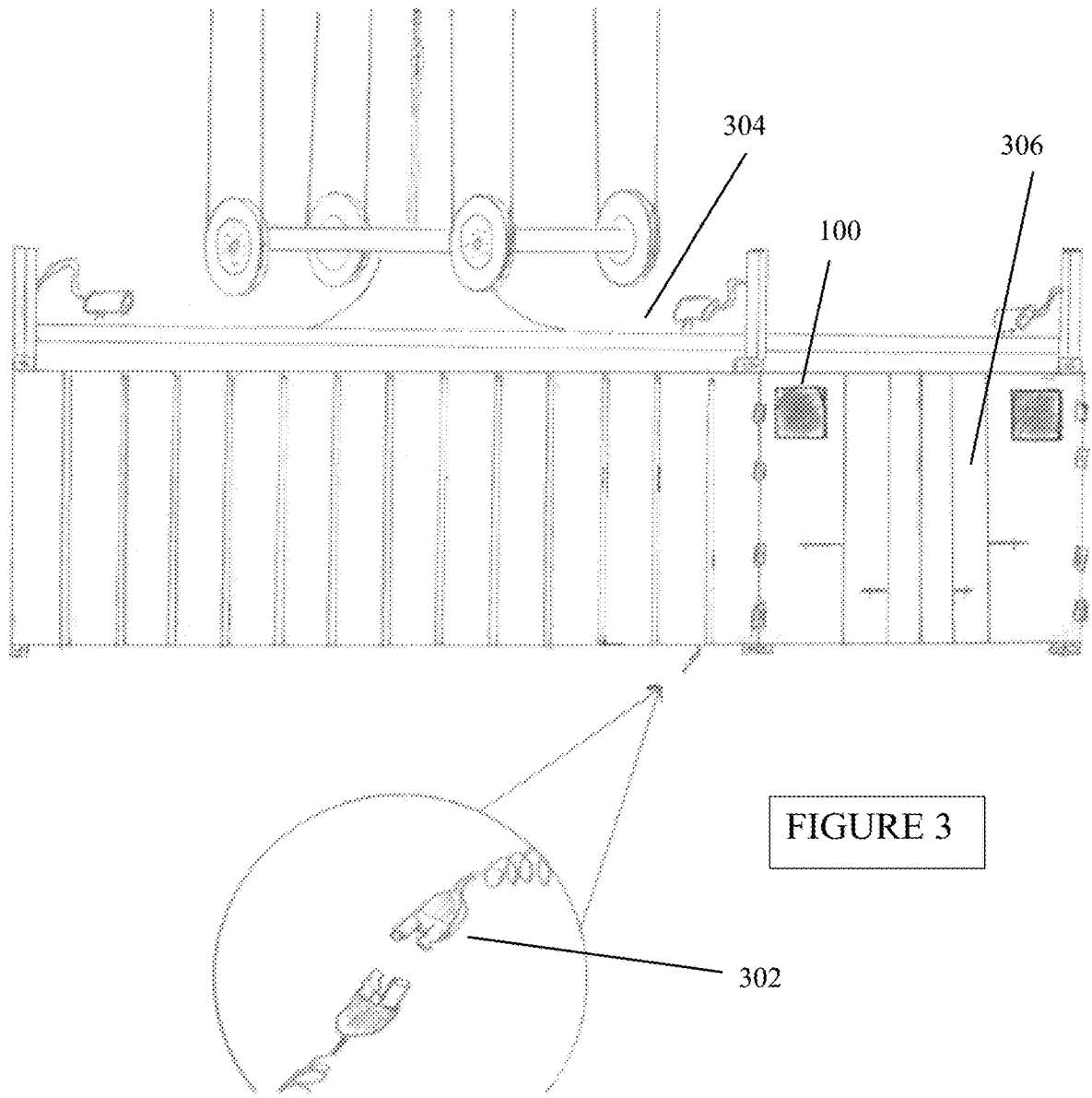
FIG. 3 depicts a large vehicle signaling system attached to a shipping container according to an embodiment of the present disclosure.

FIG. 3 depicts a large vehicle signaling system attached to shipping container 304 according to an embodiment of the present disclosure. At least one signal 100 may be attached to door 306 of shipping container 304. In different embodiments of the present disclosure, at least one signal 100 may be fixedly attached to shipping container 304 or may be removably attached. At least one signal 100 may be attached through a number of means including, but not limited to, bolts, screws, and/or adhesive. Shipping container 304 may use direct current (DC) pigtail connector 302 to attach to and utilize the lighting system of the vehicle transporting shipping container 304, in the same way the signals utilized the trailer lighting system in FIG. 2. At least one signal 100 may be positioned at least 80 inches up the height of door 306 to ensure it is visible to vehicles traveling behind shipping container 304.

Figure 4:
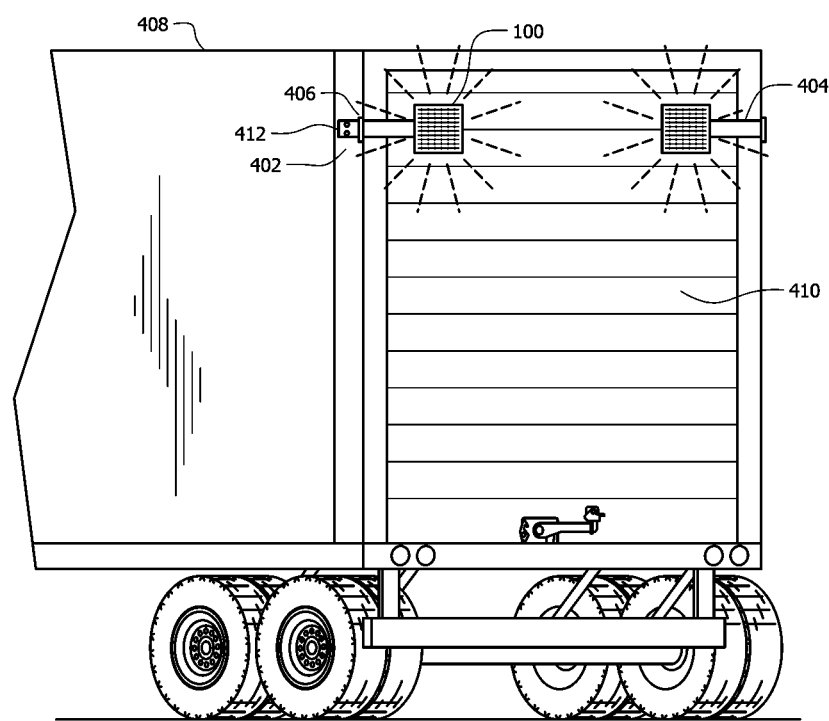
FIG. 4 depicts a large vehicle signaling system with brackets attached to a trailer according to an embodiment of the present disclosure.

FIG. 4 depicts a large vehicle signaling system with one or more brackets 412 attached to a trailer according to an embodiment of the present disclosure. Trailer 408 may have door 410 that opens by sliding up, rather than opening outward. At least one signal 100 may be attached to bracket 412. Bracket 412 may include connecting side 402 and arm 404 connected by a hinge 406. Connecting side 402 may be fixedly attached or removably attached to a side of trailer 408. Connecting side 402 may be connected through means including, but not limited to, screws, bolts, and/or adhesive. At least one signal 100 may be attached to arm 404 which may allow signal 100 to be positioned along door 410 at the rear of trailer 408. When trailer 408 arrives at its destination and door 410 needs to be opened, arm 404 and at least one signal 100 may rotate on hinge 406 to be moved away from door 410. Bracket 412 may allow hinge 406 to move arm 404 when it is appropriate but may also lock arm 404 in place when trailer 408 is in motion, so that at least one signal 100 may be properly positioned during transportation. At least one signal 100 may be connected to the lighting system in trailer 408 and not require its own power source. At least one signal 100 may be located at least 80 inches up the height of door 410 so as to be visible to vehicles further behind trailer 408. It should be understood that while FIG. 4 shows bracket 412 in use with trailer 408 having a scrolling door, bracket 412 may be used with other types of trailers and vehicles without departing from the present disclosure.

Although the figures have shown the large vehicle signaling system attached to trailers and shipping containers, it should be understood that the system may be attached and connected to all types of large vehicles. Vehicles such as box trucks, large moving vans, and construction vehicles may also make use of the system to allow for better visibility of signals. The at least one signal may be connected into the pre-existing lighting system of the vehicle that controls all the lights of the vehicle. By connecting into this system, the at least one signal does not need to have its own power supply or be separately programmed to function. When at least one signal is tied into the lighting system of the vehicle it may be used to display brake lights, turn signals, and hazard lights. By having the at least one signal located at a height of at least 80 inches vehicles further back from the large vehicle may be able to see if the large vehicle is stopping or turning no matter the amount of traffic present between them.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A large vehicle signaling system comprising:
   at least two signals removably connected to a lighting system of a large vehicle so as to work in conjunction with at least the vehicle's brake and turn lights, each of the at least two signals comprising:
      a base;
      a plurality of walls connected to the base forming a compartment;
      a plurality of Light Emitting Diode (LED) lights inside the compartment; and
      a transparent cover connected to a top portion of the walls;
   at least two brackets, each of the at least two brackets comprising:
      a connecting panel;
      an arm attached to the base of one of the at least two signals; and
      a hinge connecting the arm to the connecting panel, the hinge operable to pivot the arm around and lock the arm in place when positioned on a rear face of the large vehicle,
   wherein the at least two signals are positioned at a height of at least 80 inches from the ground.

2. The system of claim 1, wherein each of the connecting panels of the at least two brackets is fixedly attached to an opposing side face of the large vehicle such that each of the arms of the at least two brackets is positionable on the rear face of the vehicle, whereby the at least two signals are aligned.

3. The system of claim 1, wherein each of the connecting panels of the at least two brackets is removably attached to an opposing side face of the large vehicle such that each of the arms of the at least two brackets is positionable on the rear face of the vehicle, whereby the at least two signals are aligned.

4. The system of claim 1, wherein the large vehicle is a semi truck trailer.

5. The system of claim 1, wherein the large vehicle is a shipping container.

6. The system of claim 1, wherein the at least two signals are connected to the lighting system of the large vehicle through direct current pigtail connectors.

7. The system of claim 1, wherein the base and plurality of walls are made of polystyrene or polycarbonate.

8. A large vehicle signaling system comprising:
   at least two signals removably connected to a lighting system of the large vehicle so as to work in conjunction with at least the vehicle's brake and turn lights, the at least two signals comprising:
      a base;
      a plurality of walls connected to the base forming a compartment;
      a plurality of lights inside the compartment; and
      a transparent cover connected to a top portion of the plurality of walls;
   at least two brackets, each of the at least two brackets comprising:
      a connecting panel;
      an arm attached to the base of one of the at least two signals; and
      a hinge connected to the arm and the connecting panel, the hinge operable to pivot the arm around and lock the arm in place when positioned on a rear face of the large vehicle;
      wherein the at least two brackets are connected to opposing side faces of the large vehicle such that the arms of each of the at least two brackets are positionable on the rear face of the vehicle, whereby the at least two signals are aligned, and wherein the at least two signals are positioned at a height of at least 80 inches from the ground.

9. The system of claim 8, wherein the large vehicle is a semi truck trailer.

10. The system of claim 8, wherein the large vehicle is a shipping container.

11. The system of claim 8, wherein the at least two signals are connected to the vehicle's lighting system through direct current pigtail connectors.

12. The system of claim 8, wherein the base and the plurality of walls are made of polystyrene or polycarbonate.

13. The system of claim 8, wherein the lights are Light Emitting Diode (LED) lights.

* * * * *